March 8, 1932.  C. R. WALDRON  1,848,286
BICYCLE OR MOTOR CYCLE SADDLE SPRING
Filed Feb. 10, 1931  3 Sheets-Sheet 1
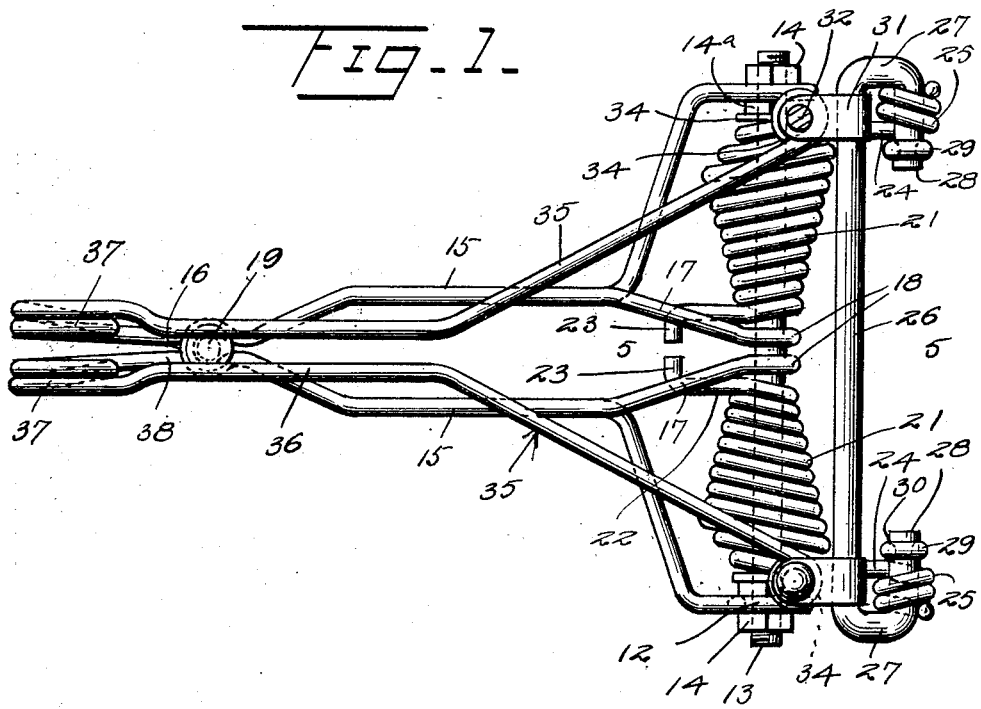
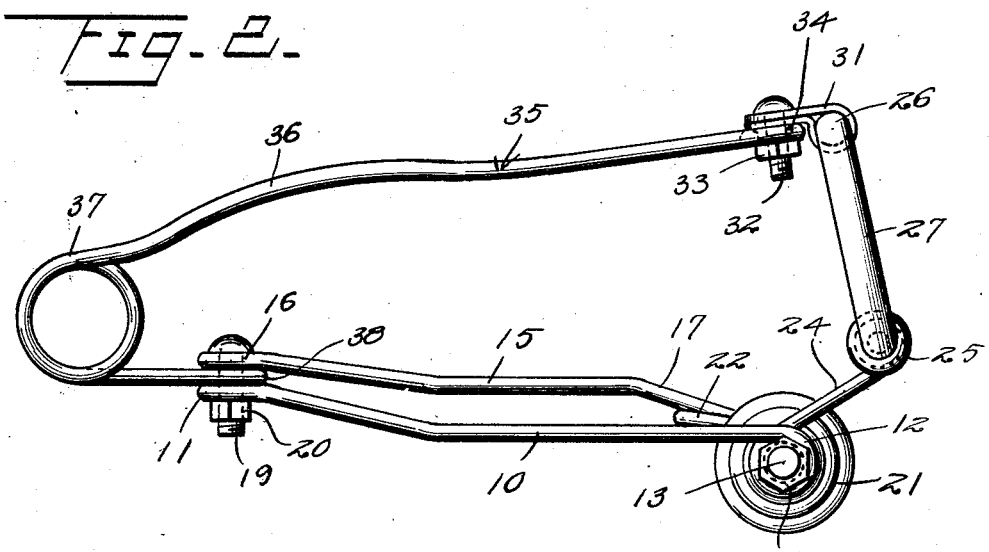
Inventor
Charles R. Waldron
By Watson E. Coleman
Attorney March 8, 1932. C. R. WALDRON 1,848,286
BICYCLE OR MOTOR CYCLE SADDLE SPRING
Filed Feb. 10, 1931 3 Sheets-Sheet 2
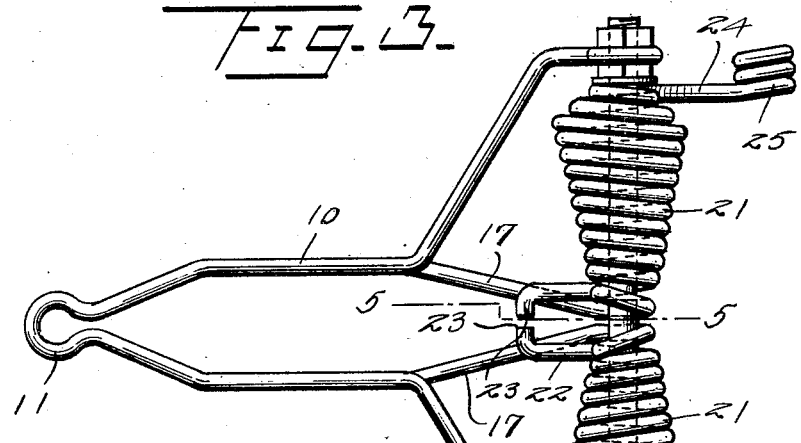
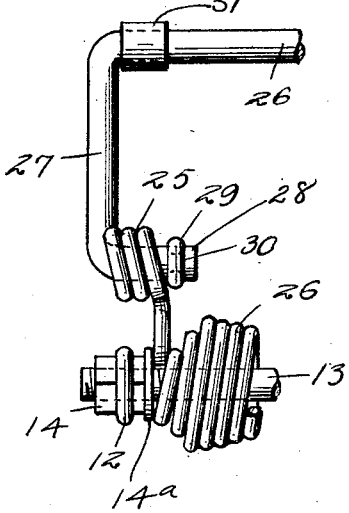
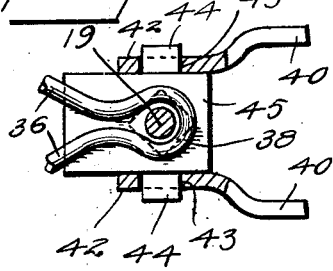
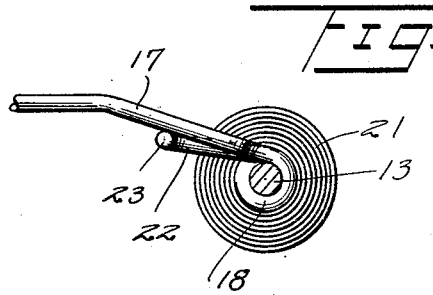
Inventor
Charles R. Waldron
By Watson E. Coleman
Attorney

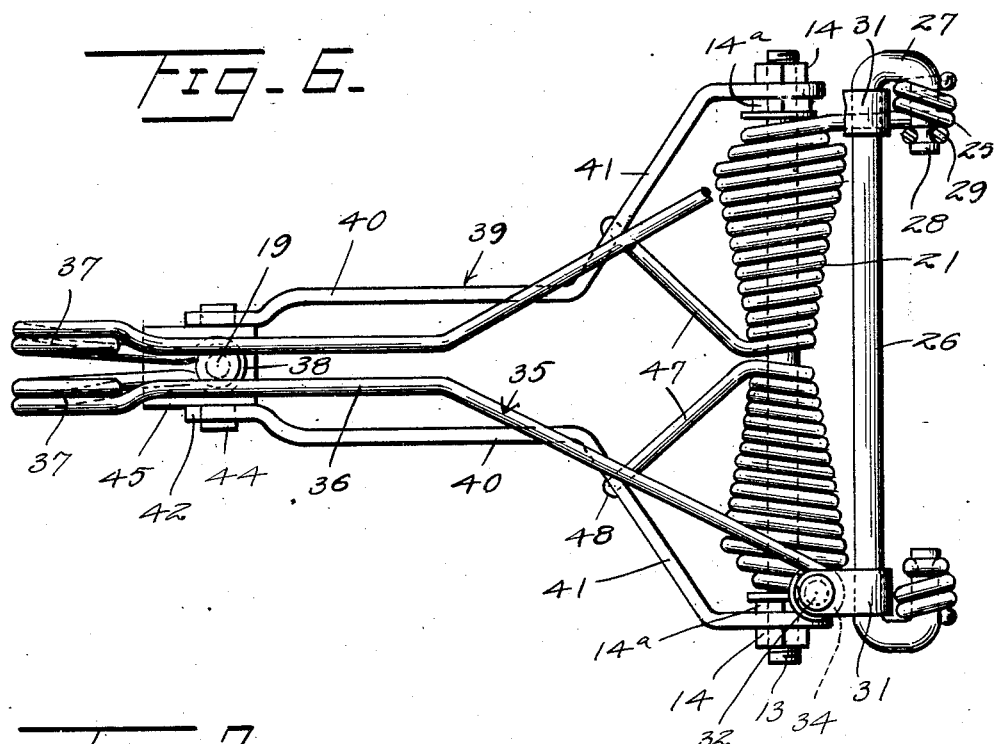
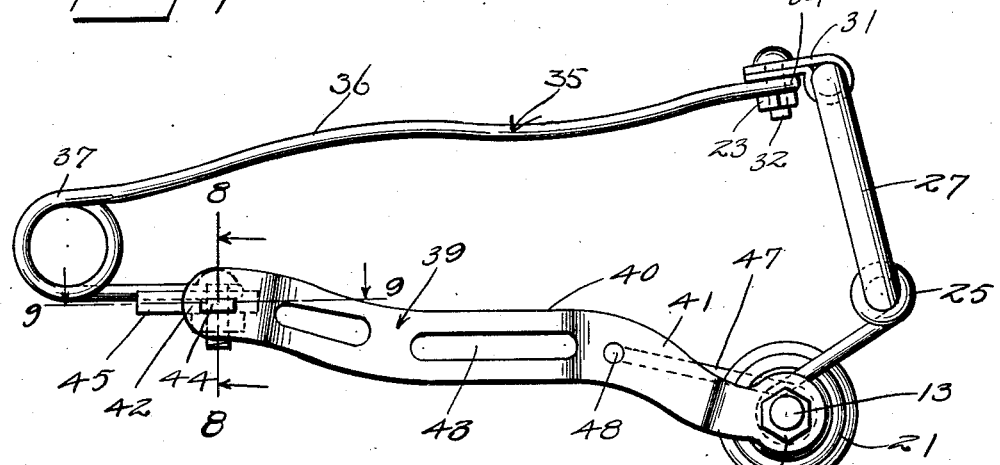
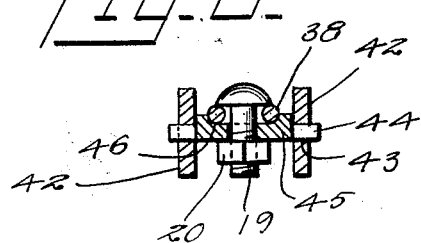

Patented Mar. 8, 1932

1,848,286

UNITED STATES PATENT OFFICE

CHARLES R. WALDRON, OF ELYRIA, OHIO

BICYCLE OR MOTOR CYCLE SADDLE SPRING

Application filed February 10, 1931. Serial No. 514,855.

This invention relates to saddle springs which are used for bicycle or motorcycle saddles.

The general object of the invention is to provide a saddle spring which will have much larger range of movement than the ordinary range of saddle spring, which will give easier riding, greater comfort, and which is cheaper to manufacture.

A further object is to provide a floating spring action which will take jar off the rider and in which the saddle and the weight of the rider is supported by a pair of conically coiled springs, which will give greater spring range to support either light or heavy persons.

A further object is to provide a saddle spring of this character, in which the saddle is supported by means of spring elements mounted upon the supporting yoke of the assembly, and in which the rear of the saddle is supported by arms extending rearward from coil springs so that the weight of the person tends to contract said coil springs to an extent depending upon the weight supported.

Other objects will appear in the course of the following description.

My invention is illustrated in the accompanying drawings, wherein:—

Figure 1 is a top plan view of one form of my invention;

Figure 2 is a side elevation thereof;

Figure 3 is an under side plan view of the structure shown in Figure 1 but without the connecting cross bar or link;

Figure 4 is a fragmentary rear elevation of a portion of the spring system and the connecting cross bar or link;

Figure 5 is a section on the line 5—5 of Figure 3;

Figure 6 is a top plan view of a modified form of the construction;

Figure 7 is a side elevation of the structure shown in Figure 6;

Figure 8 is a section on the line 8—8 of Figure 7;

Figure 9 is a fragmentary section on the line 9—9 of Figure 7.

10 designates generally a supporting truss formed of a relatively heavy wire bent at its middle to form an eye 11. The wire is then downwardly and divergently inclined to form legs and these legs are extended rearward parallel to each other and at their rear ends are formed with eyes 12 which, as shown in Figure 3, embrace the ends of a transversely extending bolt 13 carrying upon it the nuts 14 and 14a, the eyes 12 being disposed between these nuts 14 and 14a. This lower yoke 10 is the part which is designed to be connected to the saddle post of the motor-cycle or bicycle by the usual clip (not shown) and constitutes the base upon which the remainder of the spring assembly is mounted.

Disposed above the truss 10 is an upper truss 15 also formed of relatively heavy wire, this upper truss at its middle being bent to form an eye 16 which is disposed above the eye 11. The two legs of the wire are extended outward divergently, then extended parallel above the portion 10, and then extended convergently inward or toward each other as at 17 (see Figure 1) and at their rear ends are formed to provide the eyes 18 which embrace the bolt 13 at its middle. A bolt 19 passes through the two eyes 16 and 11, as shown in Figure 2 and carries the nut 20 and washers if desirable.

Surrounding the bolt 13 are the two conically coiled or helical springs 21. The inner ends of these springs which confront the eyes 18 are relatively small in diameter and the coils gradually increase towards the outer ends of the bolt 13 and then are reduced for one or two coils as shown clearly in Figures 1 and 2. The inner ends of the springs are forwardly extended at 22 and angularly bent as at 23, these portions 22—23 extending beneath the convergent portions 17 of the upper truss 15, as shown in Figure 1 and Figure 3. The lateral outer ends of the springs, as shown most clearly in Figures 3 and 4, are extended rearward at 24 and then bent to form coils 25.

Extending parallel to the springs 21 and to the bolt 13, but disposed above and slightly rearward of the bolt is a cross bar 26. This yoke or cross bar at its ends is formed with the downwardly and rearwardly extending arms 27. These arms are bent inward as at 28 and these inwardly extending ends of the arms extend through the coils 25 as shown in Figures 1 and 4.

These coils are held in place upon the arms 28 by means of the split rings 29 which embrace the extremities of the inwardly turned ends 28 and fit into grooves 30 formed adjacent these extremities, thus holding the coils 25 in place.

Attached to the ends of the cross bar 26 just inward of the arms 27 are the clips 31 (see Figure 2) which embrace the cross bar or yoke and extend forward from the same and are each perforated for the passage of the bolt 32 carrying the nut 33. These bolts 32 pass through eyes 34 formed at the extremities of the legs 35 of a spring frame. These legs, as shown in Figure 1, extend convergently forward, then parallel with each other as at 36, and downward and then are bent to form the two spring coils 37. The legs are then extended inward and joined with each other to form an eye 38 which is disposed between the forward ends of the trusses 10 and 15 and through which eye passes the bolt 19.

It will be understood, of course, that the saddle proper is mounted upon this spring frame 35 and that the truss 10 is engaged in any suitable manner with the saddle post of the machine. Therefore, it will be obvious that the weight of a rider will be supported by the spring coils 37 which will resist the downward movement of the legs 35 of the spring frame and that the weight will also be supported by the arms 24 which at their rear ends are connected to the links formed by the arms 27 of the cross bar 26 and that these arms 24 in turn are supported by the coils 21 which are prevented from rotating upon the bolt at their inner ends by means of the arms 22 which extend beneath the uppermost truss 15 as shown clearly in Figure 1. Thus the weight of the rider is supported by four springs, two of the springs being formed by the coils 37, and two of the springs by the relatively long, conically shaped coils 21.

As these coils are reduced in diameter, they become stiffer so that a certain weight will cause the large and relatively weak coils to contract, a heavier weight will cause the next successive smaller coils to contract and so on so that a greater or less portion of each coil 21 is used depending upon the weight supported. These coils thus give greater spring range than is possible with springs which are not tapered.

In Figures 6, 7 and 9, I have illustrated a modification of my invention which may be desirable in certain makes of bicycles or motorcycles, in which the upper and lower trusses 10 and 15 of heavy wire are done away with and their place taken by a truss 39, this truss consisting of two flat truss bars designated each 40. Each truss bar at its rear end is apertured for the passage of the bolt 13 and is held in place between the nuts 14 and 14ª. Each truss bar then extends forward, then laterally inward at 41, then forward and upward in parallel relation to each other, then is slightly deflected inward and then is extended forward at 42. These truss bars are preferably longitudinally slotted at 43 at a plurality of points simply for the purpose of reducing the weight and the amount of metal used, though these slots may also be used for engagement by the clip which holds the truss to the saddle post of the machine. The forward end of each truss bar 40 is engaged with the eye 38 of the spring frame 35 by the means shown in Figure 8, that is, each truss bar is apertured at 43 for the reception of lugs 44 formed upon a plate 45 which is thus disposed between the truss bars 40. This plate in turn is recessed upon its upper face at 46 to receive the eye 38 and apertured for the passage of the bolt 19 previously described, the nut 20 bearing against the bottom of the plate while the head of the bolt bears against the eye 38.

This plate 45 is relatively elongated as shown in Figure 7 so as to afford a firm support for the legs of the wire frame which extend from the wire 38. The inner ends of the springs 21 in this form of my invention instead of being extended forward and angularly bent at 23, as shown in Figure 1 are extended forward and angularly diverged at 47 and extended through apertures in the portions 41 of the truss bars 40 and overturned or headed as at 48.

It will be seen that exactly the same effect is secured with the structure shown in Figures 6 and 7 as is secured with the structure shown in Figures 1 to 5 and that the truss bars 40 are the equivalent in one sense of the two truss members 10 and 15 shown in Figure 2.

Inasmuch as the action of this mechanism has been fully described, there is no necessity of repeating it with regard to the action of the modification shown in Figure 7.

It will be seen that the structure shown in Figures 6 and 7 is the same essentially as the structure shown in Figures 1 and 2 in that both of these structures provide a truss element formed of two legs joined at their forward ends either by being formed integral with each other or by the plate 19 as shown in Figure 8, the rear ends of these legs or truss elements being connected to the supporting bolt 13 and the inner ends of the springs 21 being held from rotational movement in one case by engaging against the legs of the upper truss member 15 in Figure 2 or engaging in the truss members 38 in Figure 7. Obviously minor changes might be made in these parts without departing from the spirit of the invention, as defined in the appended claims.

It is to be understood, of course, that the bolts 32, as a matter of fact, form a portion of the saddle top or saddle proper. It is not deemed, however, necessary to show the saddle top and, therefore, the bolts 32 are shown as primarily assembled with the frame 35 and the spring clips 31. The saddle post, as before remarked, may be engaged with the pairs of wires 15 and 10 or with the truss members 39 by any suitable clips held in place by bolts passing transversely through the wires 15 or through the slots 43. With my construction, a lower riding position is obtained than with other saddle supporting frames known to me because of the tapered coil 21. These tapered coils taper toward the middle and permit a lower setting for the mud guard. The main reason for using the two irons or wires 10 and 15 is to obtain greater strength whereby the saddle spring may be used by grown up boys and men. Notwithstanding the fact that it is formed of wires. In the construction shown in Figure 7, the flat steel truss bars give a proper strength with a single member. While I have illustrated and prefer to use coil springs 21 which are tapered toward the middle of the frame, I do not wish to be limited to this except insofar as the appended claims are so limited as broadly considered a coil spring having coils of uniform diameter might be used under some circumstances.

I claim:—

1. A saddle spring including rearwardly divergent truss members connected at their forward ends, a bolt connecting and spacing the rear ends of the truss members, opposed coiled springs surrounding the bolt, each spring adjacent the end of the bolt being relatively large in diameter and the coils growing gradually less and less in diameter to the middle of the bolt, the inner ends of the springs being held from rotation, the outer ends having rearwardly extending arms, a resilient frame connected at its forward end to the truss members and having resilient legs extending rearward to a point above the coils, and elements connecting the rear ends of the legs of the frame to the arms of the coils.

2. A saddle spring including rearwardly divergent truss members connected at their forward ends, a bolt connecting and spacing the rear ends of the truss members, opposed coil springs surrounding the bolt, the inner ends of the springs being held from rotation, the outer ends having rearwardly extending arms, a resilient frame connected at its forward end to the forward ends of the truss members and at its rear end being connected to and supported by the rearwardly extending arms of said springs.

3. A saddle spring including rearwardly divergent truss members connected at their forward ends, a bolt connecting and spacing the rear ends of the truss members, opposed coil springs surrounding the bolt, the inner ends of the springs being held from rotation, the outer ends having rearwardly extending arms, a spring frame connected rearward of its forward end with the forward ends of the truss members and having legs each extending forward and then coiled and then extending rearward in divergent relation to each other, the rear ends of said legs being operatively connected to the arms of the springs.

4. A saddle spring including rearwardly divergent truss members connected at their forward ends, a bolt connecting and spacing the rear ends of the truss members, opposed coil springs surrounding the bolt, the inner ends of the springs being held from rotation, the outer ends having rearwardly extending arms, a spring frame connected rearward of its forward end with the forward ends of the truss members and having legs each extending forward and then coiled and then extending rearward in divergent relation to each other, the rear ends of said legs extending to a point above the arms of the springs and being operatively connected thereto.

5. A saddle spring including rearwardly divergent truss members connected at their forward ends, a bolt connecting and spacing the rear ends of the truss members, opposed coil springs surrounding the bolt, the inner ends of the springs being held from rotation, the outer ends having rearwardly extending arms, a spring frame connected rearward of its forward end with the forward ends of the truss members and having legs each extending forward and then coiled and then extending rearward in divergent relation to each other, the rear ends of said legs extending rearward to a point above the arms of said springs and being a cross bar connected to said clips and having downwardly and rearwardly extending arms, the arms at their ends being operatively connected to the arms of the first-named springs.

6. A saddle spring of the character described, including rearwardly divergent truss members connected at their forward ends, a bolt connecting and spacing the rear ends of the truss members, opposed coil springs surrounding the bolt, the inner ends of the springs being held from rotation, the coils of the springs being gradually enlarged in diameter toward the outer ends of the springs and having rearwardly extending arms, a spring frame connected at its forward end to the truss members, opposed coil springs surrounding the bolt, the inner ends of the springs being held from rotation, the coils of the springs being gradually enlarged in diameter toward the outer ends of the springs and having rearwardly extending arms, a spring frame connected at its forward end to the truss members and comprising legs extending rearward in divergent relation to each other to a point above the arms of the coil springs, a cross bar operatively connected to the rear ends of said legs, the cross bar having downwardly and rearwardly extending arms constituting links and operatively connected to the arms of said first named springs.

7. A saddle spring of the character described, including rearwardly divergent truss members connected at their forward ends, a bolt connecting and spacing the rear ends of the truss members, opposed coil springs surrounding the bolt, the inner ends of the springs being held from rotation, the coils of the springs being gradually enlarged in diameter toward the outer ends of the springs and having rearwardly extending arms, a spring frame connected at its forward end to the truss members, opposed coil springs surrounding the bolt, the inner ends of the springs being held from rotation, the coils of the springs being gradually enlarged in diameter toward the outer ends of the springs and having rearwardly extending arms, a spring frame connected at its forward end to the truss members and comprising legs extending rearward in divergent relation to each other to a point above the arms of the coil springs, a cross bar operatively connected to the rear ends of said legs, the cross bar having downwardly and rearwardly extending arms constituting links, the extremities of the arms of the cross bar being turned inward and the arms of said springs being coiled around the inwardly turned extremities of the arms of the cross bar.

8. A saddle spring including rearwardly divergent truss members connected at their forward ends and formed at their rear ends with eyes, a bolt passing through said eyes, nuts on opposite ends of the bolt engaging said eyes and spacing the rear ends of the truss members apart, opposed coil springs surrounding the bolt, the inner ends of the springs being held from rotation, the outer ends having rearwardly and upwardly directed arms, a spring frame connected at its forward end to the forward ends of the truss members and having rearwardly divergent legs, a cross bar to which said legs are operatively connected, the cross bar having downwardly extending arms constituting links, said arms having lateral extensions, the rear ends of the spring arms being coiled around said extensions.

9. A saddle spring including rearwardly divergent truss members connected at their forward ends, a bolt passing through the rear ends of the truss members and spacing them apart, opposed coiled springs surrounding the bolt, the inner ends of the springs being held from rotation, the outer ends having rearwardly extending arms, a spring frame formed of a single length of resilient wire, the wire being bent at its middle to form an eye, the wire then extending forward in the form of two legs, the legs being coiled and then extending rearward and divergently to a point above the coils, a cross bar operatively connected to the rear ends of said legs, the cross bar having downwardly extending arms, the arms being operatively connected to the arms of said springs, and a bolt connecting the bight end of the spring frame to the truss members.

10. A saddle spring including a lower truss member having rearwardly divergent legs formed with eyes at their rear ends, the forward ends of said legs being connected, a bolt passing through the eyes at the rear of said legs, and having nuts spacing said legs apart, an upper truss member formed to provide a bight portion and rearwardly directed legs, the legs at their rear ends having eyes through which said bolt passes, means connecting the bight ends of the upper and lower truss members, opposed coiled springs surrounding the bolt, the inner ends of the coil springs being held from rotation, the outer ends of the coil springs having rearwardly extending arms, and a spring frame formed to provide a bight portion operatively connected to the forward ends of the upper and lower truss members and formed to provide independent coils, and legs extending rearward divergently to a point above said springs, a cross bar connecting the rear ends of said legs and having downwardly extending arms, the arms being operatively connected to the rear ends of said spring arms.

11. A saddle spring including rearwardly divergent truss members, each comprising a strip of metal, a plate having lugs engaged with the forward ends of said truss arms and connecting the same, a bolt extending through the rear ends of the truss arms and having nuts inward and outward of the truss arms and connecting the truss arms to the bolt and spacing the truss arms from each other, coiled springs surrounding the bolt, the inner ends of said springs being extended and engaged with said truss arms to thereby hold the inner ends of the springs from rotation, the outer ends of the springs being rearwardly extended to form arms, a spring frame having two legs, the legs being joined at one point and forward of this point being formed to provide a coil, the legs then extending rearward and upward, clips attached to the rear ends of the legs, a cross bar engaged by said clips, the cross bar having downwardly and rearwardly extending arms, having angular portions at their lower ends, the spring arms at their rear ends being coiled around said angular portions of the cross bar arms.

12. A saddle spring including a base element adapted to be attached to a saddle post, a saddle supporting resilient frame operatively connected at its forward end to the base element, opposed horizontally disposed coiled springs operatively mounted on the base element, the inner ends of the springs being held from rotation, the outer ends of the springs extending rearwardly, and linking means attached to the rear of the spring frame and extending downward and operatively connected to the rearwardly extending arms of the coiled springs.

In testimony whereof I hereunto affix my signature.

CHARLES R. WALDRON.